(No Model.)
A. F. RANSOM.
HORSE BLANKET.
No. 544,590. Patented Aug. 13, 1895.
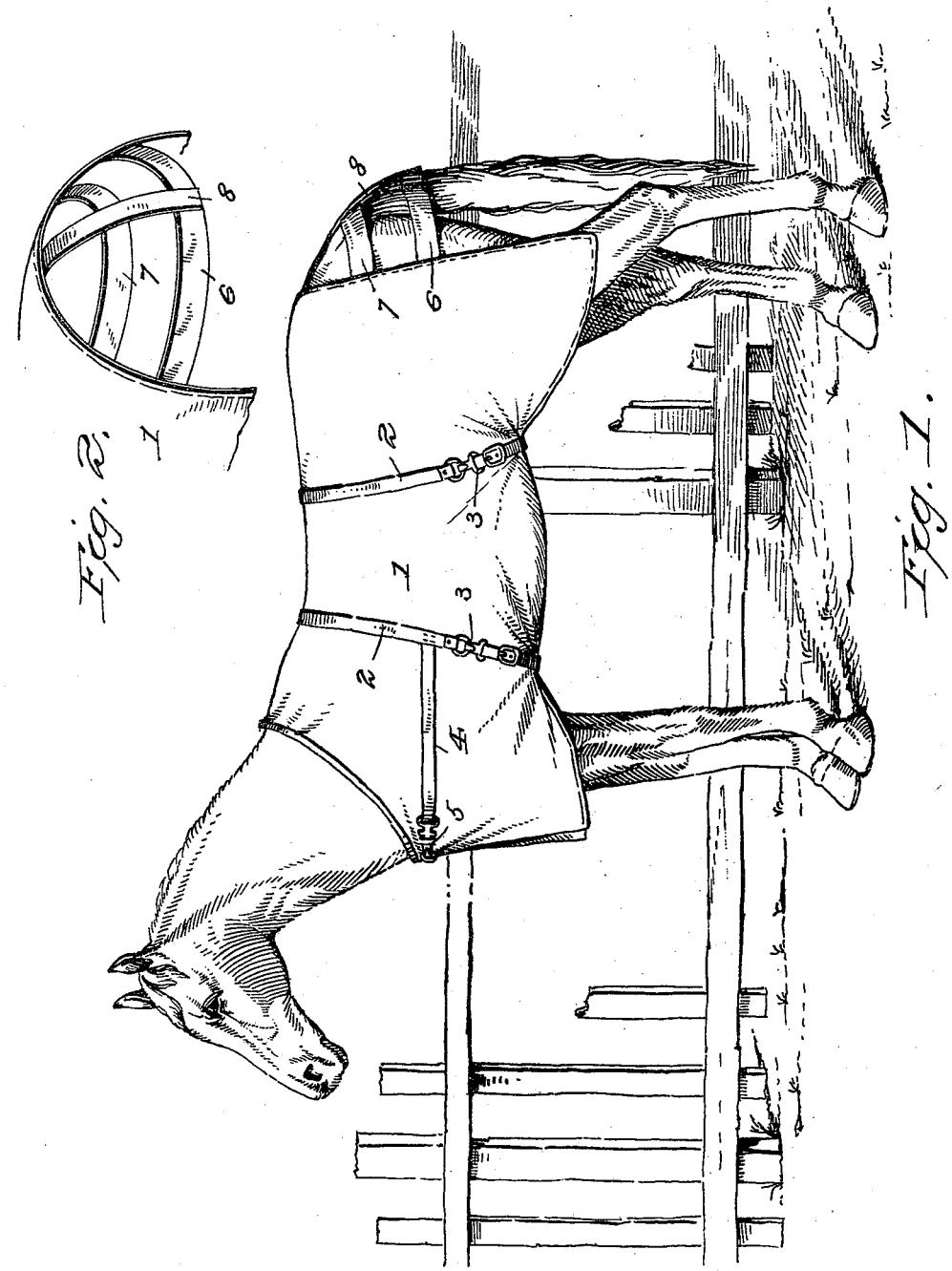
Witnesses,
Inventor, ns
UNITED STATES PATENT OFFICE.

ALBERT F. RANSOM, OF BURLINGTON, WISCONSIN, ASSIGNOR TO THE BURLINGTON BLANKET COMPANY, OF SAME PLACE.

HORSE-BLANKET.

SPECIFICATION forming part of Letters Patent No. 544,590, dated August 13, 1895.

Application filed July 25, 1894. Serial No. 518,523. (No model.)

*To all whom it may concern:*

Be it known that I, ALBERT F. RANSOM, a citizen of the United States, residing at Burlington, in the county of Racine and State of Wisconsin, have invented certain new and useful Improvements in Horse-Blankets; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to horse blankets or covers of that class worn by horses when in the stable, and is an improvement on the blanket for which I obtained Letters Patent March 10, 1891, No. 447,793; and it has for its object to form a blanket which will be comparatively cool for the horse in hot weather and which will at the same time fit to the rump of the horse in such manner that it will not turn upon the horse or slip down one side and up the other of the rump, or from the rump over onto the body of the horse, but which, to the contrary, will hold to the rump of the horse, and thus always be maintained in proper position on the horse, while at the same time it will be open at the rear, so that the horse will be kept as cool as possible.

To the accomplishment of the foregoing objects the invention consists in providing the rear portion of the blanket with an open hood adapted to fit over the rump of the horse and over the dock or vertebral portion of the tail for some distance below the root of the tail, whereby the blanket is held to the rump and prevented from moving lengthwise of the horse or slipping down the haunches of the horse, all as will be hereinafter more particularly described, reference being had to the accompanying drawings, forming a part hereof, in which—

Figure 1 is a side view of the horse to which is applied a blanket embodying my invention; and Fig. 2 is a perspective of a portion of the rear part of a blanket, showing the feature of my open or ventilating hood.

In the drawings the numeral 1 designates a blanket or cover made of any of the materials commonly used for horse blankets or covers, which is provided with the transverse bands 2, having suitable buckles 3 for strapping the blanket around the horse, and also having the breast stays or bands 4, which will be provided with a suitable buckle 5 or other suitable fastening for securing the blanket about the breast of the animal.

It will be observed that the blanket proper covers only a portion of the rump of the horse, and that the other portion of the rump and the upper portion of the horse's tail for some distance below the root of the tail is covered by an open hood, which may be composed of any desired number of bands, but which is represented as preferably formed of two transverse bands 6 and 7 and the connecting band or strip 8. The hood thus formed causes the blanket to fit to the rump of the horse, so that it will not rub from off the rump by movement of the horse against the sides of the stall or in lying down or rising up.

It will be observed that the hood, practically, is that portion which lies above the transverse band 6, which practically is the band that gives function to the hood, for if this band at about this point were omitted and only the band 7 employed at the point where it is illustrated the results sought to be accomplished would not be affected, because the band 7 is not in such a position as to hold the blanket to the rump; but the band 6, lying lower down and passing across the dock or vertebral portion of the tail at some distance below the root of the tail, imparts the necessary shape to the blanket when on the horse to hold the blanket to the rump. The band 6, therefore, is the essential band of the hood, and, in effect, that band forms the hood, the band 7 serving as a strengthening-band and the strip 8 as a supporting-strip which prevents the band 6 from dropping below the effective point. The advantage of this open hood is that it affords a ventilating-cover, so that the body of the horse where the hood is formed in the blanket is kept comparatively cool and the blanket is held to the rump, so as not to be worked off, as is the case in blankets that have no hood to fit down over the upper portion of the tail of the horse. It may also be remarked that this hood will afford some protection against the horse rubbing his tail against the stall—that is, it will protect the tail against the bad effects and injury frequently resulting from the horse rubbing up against the stall with his tail. I have illustrated and described what I consider to be the best form of this open or ventilated hood, but it is obvious that changes can be made from this illustration without departing from the spirit of my invention.

Having described my invention and set forth its merits, what I claim is—

1. A horse blanket or cover having at its rear an open hood covering the upper portion of the horse's tail and extending across the dock or vertebral part of the tail at a point below the root of the tail so as to hold the blanket to the rump of the horse and prevent it from working off, the rear portion of the blanket extending below said hood and its opposite edges being separated substantially as and for the purposes described.

2. A horse blanket or cover provided at its rear with an open hood formed of a transverse band or bands and a connecting band or strip, said bands forming a hood which fits over the dock or vertebral portion of the horse's tail and extends down the tail, the rear portion of the blanket extending below said hood and its opposite edges being separated some distance from the root of the tail, substantially as and for the purposes described.

In testimony whereof I affix my signature in presence of two witnesses.

ALBERT F. RANSOM.

Witnesses:
R. L. RANSOM,
G. C. RASCH.